(12) United States Patent
Watson

(10) Patent No.: US 7,634,535 B2
(45) Date of Patent: Dec. 15, 2009

(54) METHOD AND SYSTEM FOR TRACKING MULTIPLE INFORMATION FEEDS ON A COMMUNICATIONS NETWORK

(76) Inventor: Stuart T. Watson, 4428 Mariner Dr., Frisco, TX (US) 75034

( * ) Notice: Subject to any disclaimer, the term of this patent is extended or adjusted under 35 U.S.C. 154(b) by 671 days.

(21) Appl. No.: 11/226,830

(22) Filed: Sep. 14, 2005

(65) Prior Publication Data

US 2006/0095507 A1 May 4, 2006

Related U.S. Application Data

(60) Provisional application No. 60/609,768, filed on Sep. 14, 2004.

(51) Int. Cl.
*G06F 15/16* (2006.01)
*G06F 19/00* (2006.01)

(52) U.S. Cl. ............... 709/203; 709/217; 709/201; 370/462; 370/46; 705/3; 705/2

(58) Field of Classification Search ........ 709/203, 709/223–226, 217, 201
See application file for complete search history.

(56) References Cited

U.S. PATENT DOCUMENTS

| | | | |
|---|---|---|---|
| 4,797,875 A | 1/1989 | Pospischil | |
| 5,151,899 A | 9/1992 | Thomas | |
| 5,796,952 A | 8/1998 | Davis | |
| 5,848,396 A | 12/1998 | Gerace | |
| 5,949,415 A | 9/1999 | Lin | |
| 5,991,735 A | 11/1999 | Gerace | |
| 6,035,332 A | 3/2000 | Ingrassia | |
| 6,321,338 B1 | 11/2001 | Porras | |
| 6,341,304 B1 | 1/2002 | Engbersen | |
| 6,381,632 B1 | 4/2002 | Lowell | |
| 6,389,538 B1 | 5/2002 | Gruse | |
| 6,629,154 B1 | 9/2003 | Jones | |
| 6,785,723 B1 | 8/2004 | Genty | |
| 6,898,625 B2 | 5/2005 | Henry | |
| 6,971,028 B1 | 11/2005 | Lyle | |
| 6,976,010 B2 | 12/2005 | Banerjee | |
| 7,020,082 B2 | 3/2006 | Bhagavath | |
| 7,020,635 B2 | 3/2006 | Hamilton | |
| 7,039,699 B1 | 5/2006 | Narin | |
| 7,103,657 B1 | 9/2006 | Mariani | |
| 2002/0065034 A1* | 5/2002 | Zhang | 455/2.01 |
| 2002/0174230 A1 | 11/2002 | Gudorf | |
| 2002/0178180 A1 | 11/2002 | Kolosova | |
| 2003/0046409 A1 | 3/2003 | Graham | |

(Continued)

OTHER PUBLICATIONS

International Search Report PCT/US200532726.

(Continued)

*Primary Examiner*—Jude Jean-Gilles
(74) *Attorney, Agent, or Firm*—Lesavich High-Tech Law Group, P.C.; Stephen Lesavich

(57) ABSTRACT

A method and system for tracking multiple information channels, the end-users of those channels, and the distribution partners utilizing those channels to re-syndicate the information on a communications network. The method and system may be used to collect and use information associated with syndicated information requests. The methods and system described herein may also provide the ability to personalize, customize, and target users of network devices via their requests for syndicated information including anonymous users.

29 Claims, 10 Drawing Sheets

U.S. PATENT DOCUMENTS

| | | |
|---|---|---|
| 2003/0110252 A1 | 6/2003 | Yang-Huffman |
| 2003/0115316 A1 | 6/2003 | Yang-Huffman |
| 2003/0223367 A1 | 12/2003 | Shay |
| 2004/0073655 A1 | 4/2004 | Kan |
| 2005/0216519 A1 | 9/2005 | Mayo |
| 2006/0028996 A1 | 2/2006 | Huegen |
| 2006/0129907 A1 | 6/2006 | Volk |
| 2006/0179133 A1 | 8/2006 | Mariani |
| 2007/0198701 A1* | 8/2007 | Pindra et al. ................ 709/224 |

OTHER PUBLICATIONS

Written Opinion of the International Searching Authority for PCT/US200532726.

Pilgram, M. (2003): "The Atom API" XML.com p. 1-8.

Anonymous (2002): "Technology at Harvard Law—RSS 2.0 Specification" Berkman Center p. 1-7.

Jokela S et al (2001): "The role of structured content in a personalized news services" System Sciences. Proceedings of the 34th Annual Hawaii International Conference on Jan. 3-6, 2001. p. 2525-2534.

* cited by examiner

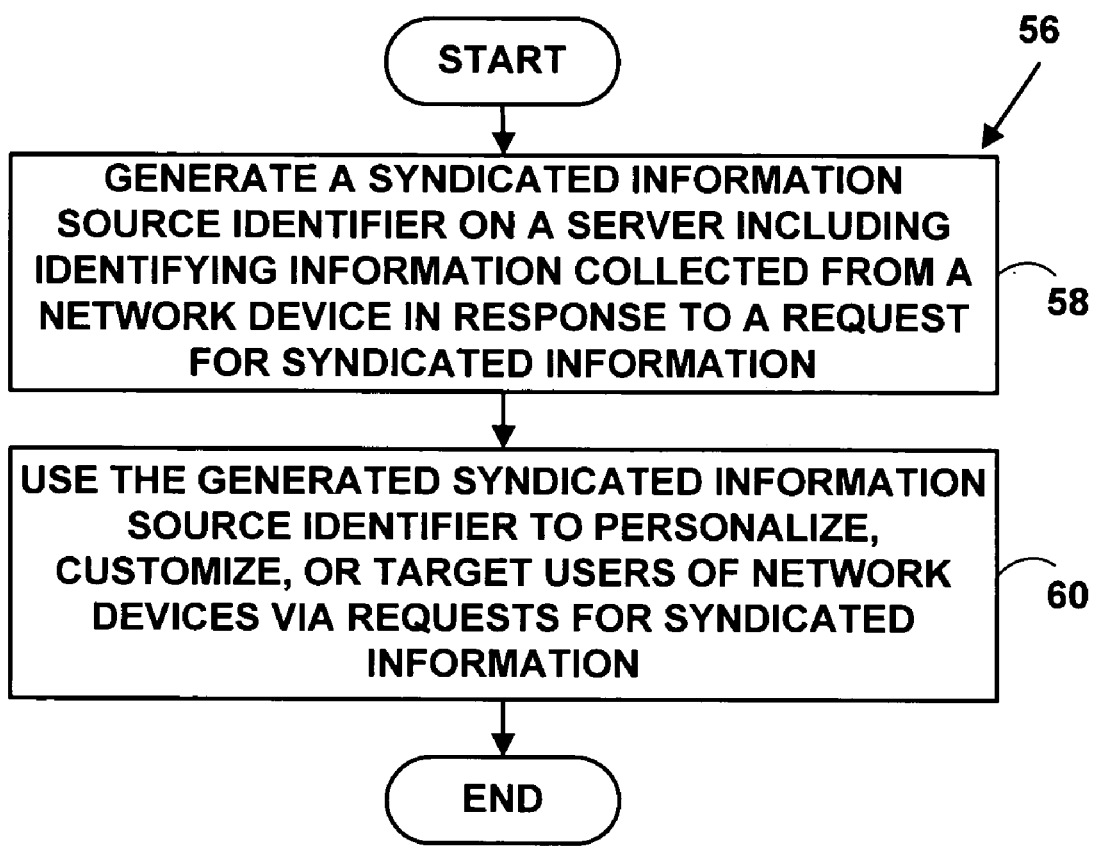

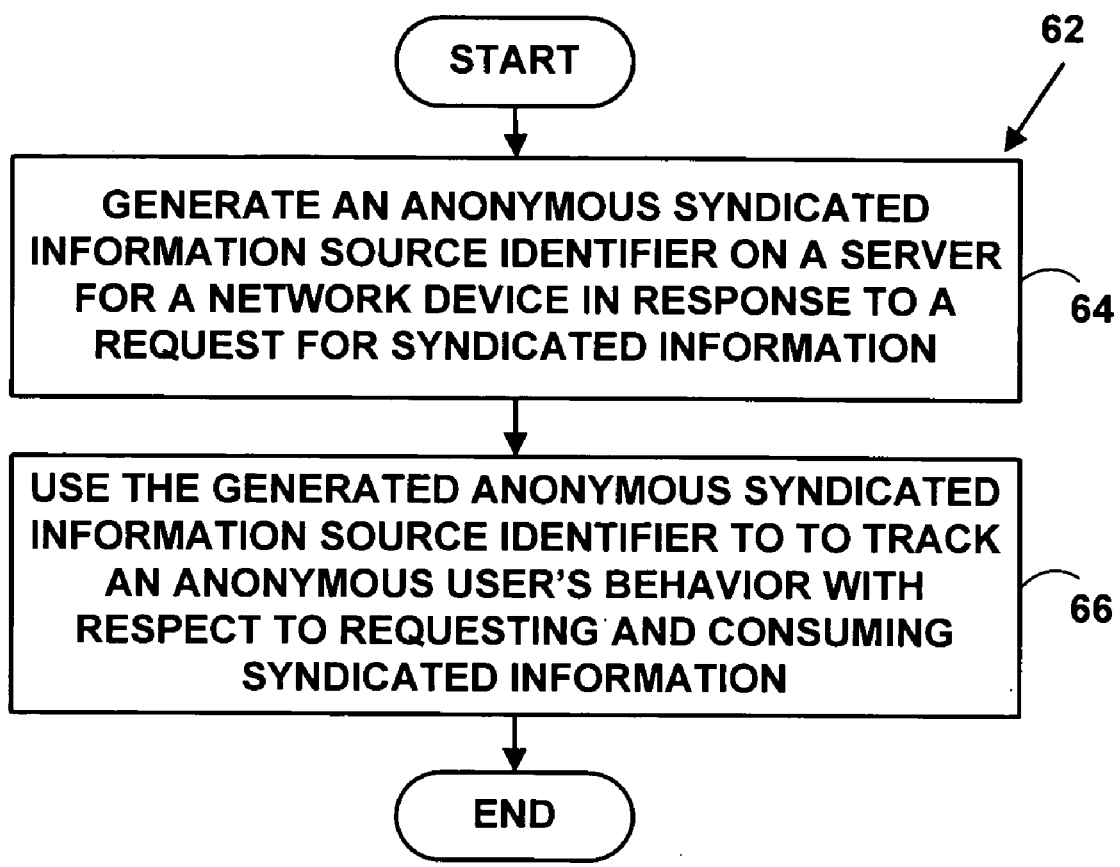

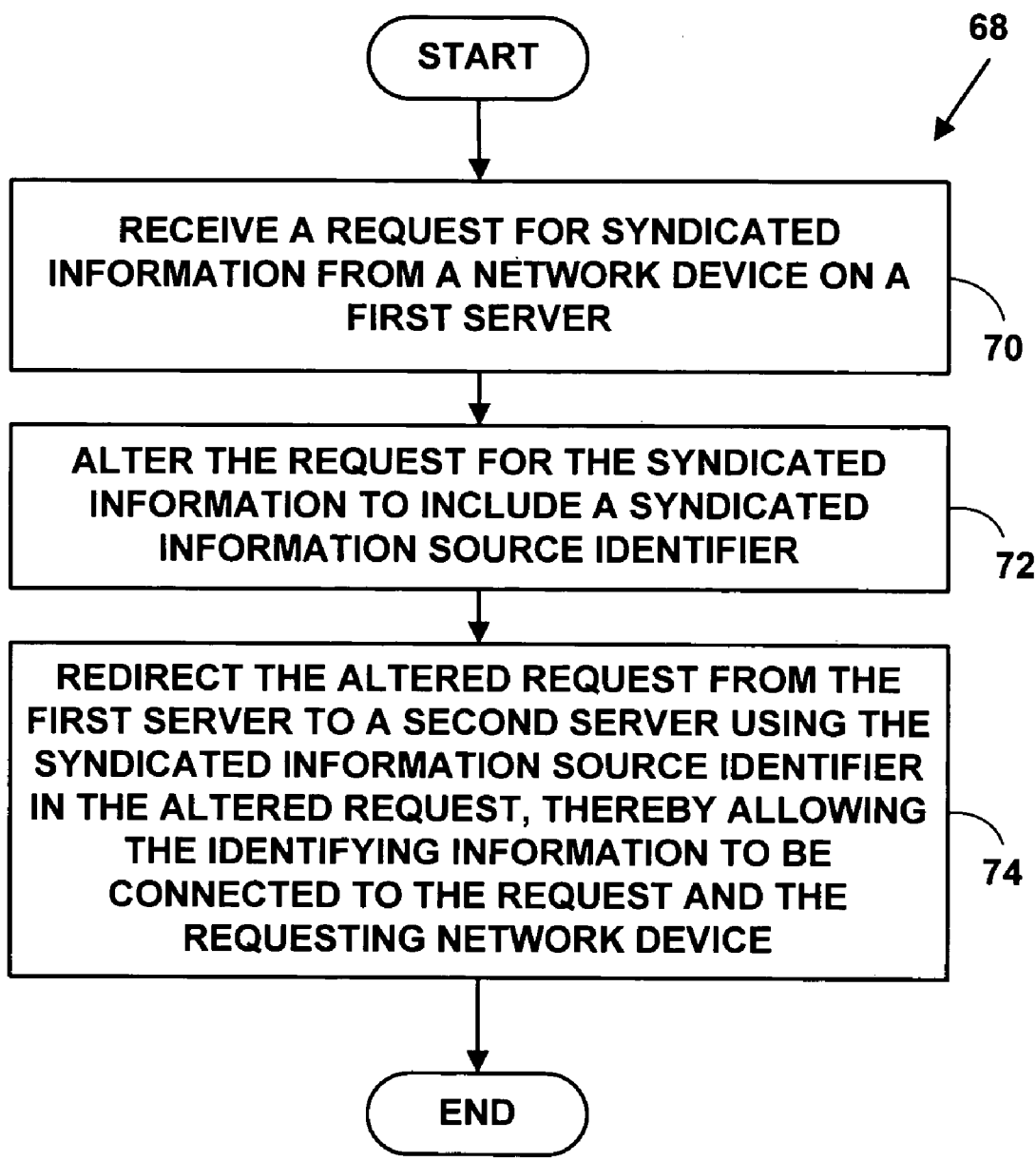

METHOD AND SYSTEM FOR TRACKING MULTIPLE INFORMATION FEEDS ON A COMMUNICATIONS NETWORK

CROSS REFERENCES TO RELATED APPLICATIONS

This application claims priority from U.S. Provisional Patent Application 60/609,768, filed Sep. 14, 2004, the contents of which are incorporated by reference.

FIELD OF THE INVENTION

This invention relates to information channels on communications networks. More specifically, it relates to a method and system for tracking multiple information feeds, the end-users of the feeds and the content (text, audio, video, or other formats) delivered through those feeds on a communications network such as the Internet.

BACKGROUND OF THE INVENTION

In the early years of the World-Wide-Web, most content providers were not concerned about sharing content with other web-sites. Today, the trend is that web-sites are increasingly interdependent and many rely upon integrating information content that originates on another web-site. Such content might include news feeds, current event listings, etc. End-users are also pulling these news/information feeds into various software applications running on numerous devices across different communications networks.

Sharing information content for distribution in many different channels on the World-Wide-Web is called "syndication." Web syndication is a form of syndication in which a section of a web-site is made available for other sites to use. For example, news information, weblogs, etc. may be syndicated. As is known in the art, a "weblog" is a web application that contains periodic ordered postings of information on a common web-page. Weblogs include individual diaries, political, consumer, commercial and other types of information.

One problem with sharing content is that users may be interested in many different websites whose content changes on an unpredictable schedule. Repeatedly checking each website to see if there is any new content can be very tedious. Electronic mail (e-mail) notification of changes was an early solution to this problem. Unfortunately, such email notifications from multiple websites were usually disorganized are often mistaken for spam.

Really Simple Syndication or Rich Site Summary (RSS) is a family of content distribution and republication (i.e., syndication) protocols primarily used by news sites and weblogs.

The Rich Site Summary (RSS) is also know as RSS 0.91, 0.92 and RSS 2.x. The Resource Description Framework (RDF) Site Summary (also RSS) is based on Netscape's RSS 0.90, which uses the World Wide Web Consortium (W3C) Resource Description Framework Standard known as RSS 1.x.

RSS provides a lightweight eXtensible Markup Language (XML) format designed for sharing electronic information such as news headlines and other electronic content on the World-Wide-Web. RSS was first developed by Netscape to drive channels for the Netscape Netcenter.

RSS defines an XML grammar for sharing electronic information. Each RSS text file contains both static information about a web-site, plus dynamic information about new electronic content, all surrounded by matching start and end tags.

Each RSS channel can contain up to fifteen items. Once information about each item is in RSS format, an RSS-aware program can check the feed for changes and react to the changes in an appropriate way.

RSS was developed built on the idea that a content provider provides an RDF XML page (i.e., RSS feed), and other web users can choose to subscribe to that page. Any time the RDF XML page is updated (e.g., a webblog, etc.) an item to the RSS feed. More information on RSS can be found on the World-Wide-Wed at the Uniform Resource Locator (URL) "blogs.law.harvard.edu/tech/rss."

"ATOM" is an XML-based file format intended to allow lists of related information, known as "feeds," to be synchronized between publishers and consumers. Feeds are composed of a number of items, known as "entries", each with an extensible set of attached metadata. For example, each entry has a title. More information about ATOM is available on the Internet at the URL "atomenabled.org."

There are several problems associated with using RSS, ATOM or other protocols to provide web syndication. One problem is that most RSS or ATOM channels are associated with a single URL. There is generally no information available about the person or machine using the RSS or ATOM information via the URL.

Another problem is that user information is typically not collected from use of RSS or ATOM channels. Such user information could be used for targeted advertising by providers of the RSS or ATOM channels and/or a distribution partner using the feed under agreement/license with the original provider.

Another problem is that RSS or ATOM aggregators or readers typically provide only basic functionality to a user that includes obtaining and displaying RSS or ATOM channel feeds.

There have been attempts to solve some of the problems associated with RSS, ATOM and other information feeds providing syndicating information. For example, U.S. Pat. No. 6,934,702 that issued to Faybishenko, et al., entitled "Method and system of routing messages in a distributed search network" teaches "a system and method for distributing search requests in a network. The system and method may also route search responses. Network nodes operating as consumer or requesting nodes generate the search requests. Nodes operating as hubs are configured to route the search requests in the network. Individual nodes operating as provider nodes receive the search request and in response may generate search results according to their own procedures and return them. Communication between nodes in the network may use a common query protocol. Hub nodes may resolve the search requests to a subset of the provider nodes in the network, for example by matching search requests with registration information from nodes. Search results may be customized at various stages in the network."

U.S. Published Patent Application No. 20050144437 that was published by Ransom et al., entitled "System and method for assigning an identity to an intelligent electronic device," teaches power management architecture for an electrical power distribution system, or portion thereof, is disclosed. The architecture includes multiple intelligent electronic devices ("IED's") distributed throughout the power distribution system to manage the flow and consumption of power from the system. The IED's are linked via a network to back-end servers. Security mechanisms are further provided which protect and otherwise ensure the authenticity of communications transmitted via the network in furtherance of the management of the distribution and consumption of electrical power by the architecture. In particular, public key cryptography is employed to identify components of the architecture and provide for secure communication of power management data among those components. Further, certificates and certificate authorities are utilized to further ensure integrity of the security mechanism."

U.S. Published Patent Application No. 20050160065 that was published by Seeman entitled "System and method for enhancing resource accessibility," teaches "a resource accessibility engine according to the present invention uses a resource-specific knowledge base and user preferences to convert a resource into an improved accessibility resource. Examples of a resource include a website, document, webpage image file, multimedia file, auditory file or any other text and/or non-text record. The resource-specific knowledge includes content and formatting information that reduces ambiguities, translates implied information into explicit information and improves the accessibility of the resource content. The user preferences represent the physical capabilities of the user's access device, and the user's semantic and personal preferences for how content should be displayed. An editor uses an annotation wizard to create the resource-specific knowledge base based on the original resource."

U.S. Published Patent Application No. 20050165615 that was published by Minar entitled "Embedding advertisements in syndicated content," teaches "Incorporating targeted ads into information in a syndicated, e.g., RSS, presentation format in an automated manner is described. Syndicated material e.g., corresponding to a news feed, search results or web logs, are combined with the output of an automated ad server. An automated ad server is used to provide keyword or content based targeted ads. The ads are incorporated directly into a syndicated feed, e.g., with individual ads becoming items within a particular channel of the feed. The resulting syndicated feed including targeted ads is supplied to the end user, e.g., as a set of search results or as a requested web log. Embedding of targeted ads into syndicated feeds and/or user response to the embedded ads is be tracked in an automated manner for billing. The automated targeting and insertion process allows ads to be kept current and timely while the original feed may be considerably older."

U.S. Patent Application No. 20050160167 that was published by Cheng entitled "Rich profile communication with notifications," teaches "a rich communication profile system with notifications. The system is a feedback mechanism that utilizes rich content, e.g., multimedia content, as one or more indicators that represent the status of a remote user. The system includes a state component that receives information relating to state of at least one entity. A notifications component dynamically renders at least one personalized graphical indicia representative of the entity's state. The entity can be a person, group of people, component, place, and object.

However, these attempts still do not solve all of the problems associated with using RSS and ATOM. Thus, it is desirable to solve some of the problems associated with using RSS, ATOM or other protocols used to provide syndicated information feeds.

SUMMARY OF THE INVENTION

In accordance with preferred embodiments of the present invention, some of the problems associated with providing syndicated information feeds are overcome. A method and system for tracking multiple information channels, unique subscribers to those feeds, and distribution partners to help syndicate the content delivered using the feeds on a communications network is presented.

The method and system may be used to collect and use information associated with syndicated information requests. The methods and system described herein may also provide the ability to personalize, customize, and target users of network devices via their requests for syndicated information including anonymous users.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 8 is a flow diagram illustrating a method for tracking requestors of syndicated information;

FIG. 9 is a flow diagram illustrating a method for tracking anonymous users of syndicated information; and FIG. 10 is a flow diagram illustrating a method for altering requests for syndicated information.

DETAILED DESCRIPTION OF THE INVENTION

Exemplar Information Providing System

Figure 1:
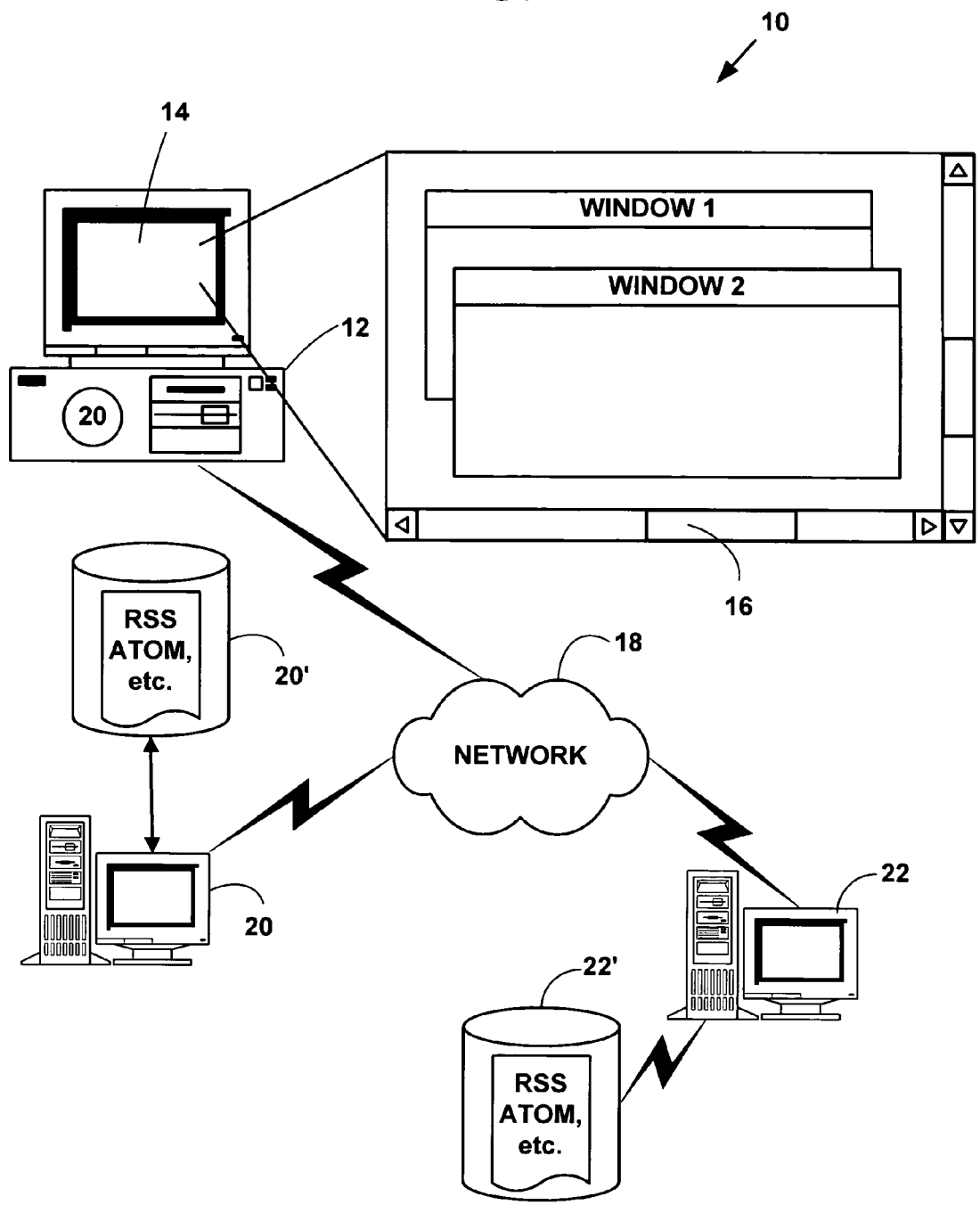
FIG. 1 is a block diagram of an exemplary information providing system.

FIG. 1 is a block diagram illustrating an exemplary information providing system 10. The exemplary information providing system 10 includes, but is not limited to, one or more network devices 12 including a computer with an associated display 14. The display 14 presents a windowed graphical user interface (GUI) 16 with multiple windows to a user. The one or more network devices 12 may be replaced with client terminals in communications with one or more servers, a personal digital/data assistant (PDA), a laptop computer, a mobile computer, an Internet appliance, one or two-way pagers, mobile phones, set top boxes, digital video recording (DVR) devices (e.g., TiVo, etc.) other similar mobile or handheld electronic device. The client terminals may also be included in a mobile vehicle such as a car, truck, airplane, ship, etc.

The one or more network devices 12 are also in communications with a communications network 18. Functionality of the system 10 can also be distributed over plural network devices 12 via the communications network 18.

The communications network 28 includes, but not limited to, the Internet, an intranet, a wired Local Area Network (LAN), a wireless LAN (WiLAN), a Wide Area Network (WAN), a Metropolitan Area Network (MAN), Public Switched Telephone Network (PSTN), Cable Television (CATV), satellite network, and other types of communications networks 18 providing voice, video and data communications.

Preferred embodiments of the present invention includes devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, ADSL Forum, However, the present invention is not limited to this embodiment and network devices and interfaces based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

The communications network 18 includes wireless transport networks. The wireless transport network includes, but is not limited to, a paging and wireless messaging network, a cellular telephone network, a Packet Cellular Network ("PCN") or Global System for Mobile Communications, ("GSM"), Generic Packet Radio Services ("GPRS"), or network/Personal Communications Services network ("PCS"), a Cellular Digital Packet Data ("CDPD") or Wireless Application Protocol ("WAP") or Digital Audio Broadcasting ("DAB") network, or Bluetooth, 802.11b, or other type of wireless transport networks. The wireless transport network also includes, but is not limited to Code Division Multiple Access ("CDMA"), Time Division Multiple Access ("TDMA"), or other wireless technologies.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM is currently not widely used in the United States, but its use is growing. GSM is a wireless platform based on TDMA to digitize data. GSM includes not only telephony and Short Message Services ("SMS") but also voice mail, call forwarding, fax, caller ID, Internet access, and e-mail. As is known in the art, SMS is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network ("PCN") includes various types of packetized cellular data.

In one embodiment of the present invention, the wireless transport network includes network interfaces that include but are not limited to, an IEEE 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN), "RF Home" or other wireless interfaces.

As is known in the art, 802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org."

The communications network 18 may include one or more gateways, routers, bridges or switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between communication network segments. A switch typically operates at a data link layer (layer 2) and sometimes a network layer (layer 3) of the OSI Reference Model and therefore supports virtually any wired or wireless data packet protocol.

The communications network 18 may include one or more servers 22, 24 (two of which are illustrated) and one or more web-sites accessible by users to send and receive information useable by the one or more network devices 12. The one or more servers, 22, 24 include one or more associated databases 22', 24' for storing electronic information.

The one or more servers 22, 24 are associated with one or more databases 22', 24' includes electronic information in various digital data formats. The one or more databases 22', 24' may be integral to a memory system on the associated servers 22, 24 or in external or internal secondary storage such as a hard disk, floppy disk, optical disk, or other non-volatile mass storage devices. The network device 12 includes one or more applications 20 for presenting electronic information to a user. The one or more applications 20 include, but is not limited to, one or more content aggregation clients and one or more content aggregation readers.

The communications network 18 includes, but is not limited to data networks using the Transmission Control Protocol (TCP), User Datagram Protocol (UDP), Internet Protocol (IP) and other data protocols. The communications network also includes networks allowing the RSS, ATOM and other protocols used for one party to syndicate information for end-users, distribution partners (search engines, information portals (Yahoo, AOL or similar) or directory listings to pull the information into a content aggregation client application 20 and/or a web page, and/or another network device.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is know in the art, UDP provides a connectionless mode of communications with datagrams in an interconnected set of computer networks. UDP provides a transaction oriented datagramn protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 28 and the present invention is not limited to TCP/UDP/IP.

Really Simple Syndication or Rich Site Summary (RSS) is a family of XML based web content distribution and republication (i.e., syndication) protocols primarily used by news sites and weblogs.

The Rich Site Summary is also know as RSS 0.91, 0.92 and RSS 2.x and Resource Description Framework (RDF) Site Summary is based on Netscape's RSS 0.90, which used the World Wide Web Consortium (W3C) Resource Description Framework Standard known as RSS 1.x, the contents of all of which are incorporated by reference. The RSS 2.0 draft specification is incorporated by reference.

"ATOM" is an XML-based file format intended to allow lists of related information, known as "feeds", to be synchronized between publishers and consumers. For more information on ATOM see IETF "draft-ietf-atompub-protocol-00.txt," the contents of which are incorporated by reference.

The electronic information in the one or more database 22', 24' include RSS, ATOM, or other XML or other mark-up language format information files.

The communications network 18 may also include wired connections, including portions of a Public Switched Telephone Network (PSTN) or cable television network (CATV) that connects the one or more network devices 12 via one or more twisted pairs of copper wires, coaxial cable, fiber optic cable, other connection media or other connection interfaces with corresponding wired connection protocols (e.g., DSL, ADSL, ISDN, etc.) The PSTN is any public switched telephone network provided by AT&T, GTE, Sprint, MCI, SBC, Verizon and others.

An operating environment for the devices of the information processing system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Syndicated Information

To syndicate information for end-users content authors maintain a list of available information locations on a server 22, 24. This list of available information locations are called "Feeds". Users who are interested in finding out the latest headlines or changes associated with a feed can check these lists. Special application programs 20 called "Aggregators" have been developed that automatically access the information feeds of web-sites of interest and organize the results. (These "feeds" and "aggregators" are also sometimes called "Channels" and "Readers"). Aggregators include software applications running on a end-user's device 12 (laptop, mobile device, Tivo, automobile, etc.) or a server based aggregator 20, 22 (Blogliness, My Yahoo, etc.) who can syndicate to other end-user devices. Aggregators also include search engines/information portals (Google, Feedster, etc.) who index the content, present content using a web browser or other software application used to read, listen, view digital content as well as re-syndicate the content and/or feed URL.

A news aggregator is software that periodically reads a set of news sources, in one of several XML-based formats, finds the new bits, and displays them in reverse-chronological order or some other order, on a single page. Periodically (e.g., every hour) the aggregator reads the "feeds" a user subscribed to. When a user sees an item to amplify with his/her own comments, or pass on to others in organization or interest group, with a couple of clicks the user can "route" it to the home page of a "weblog." Aggregators and weblog software are flip-sides of the same idea. Weblogs are for writing, aggregators for reading, and at the intersection is routing.

Syndicated information provided using RSS, ATOM, etc. provides very basic information to do its notification. It is made up of a list of items presented in order from newest to oldest or other orders. Each item usually consists of a simple title describing the item along with a more complete description and a link to a web page with the actual information being described. Sometimes this description is the full information to be read (e.g., such as the content of a weblog post) and sometimes it is just a summary.

The items can also include an enclosure tag that can be used to deliver audio, video, etc. as well as software updates. Both RSS and ATOM support enclosure tags.

An enclosure tag defines an "attachment" to an RSS or ATOM item, and is typically used to allow a feed reader to download a large multimedia file in advance of its use. Attachments are used to support downloading files of various formats including audio and video. The format of the enclosure element is illustrated in Table 1.

TABLE 1

```
<enclosure url="LINK" length="SIZE" type="FORMAT" />
<enclosure url="http://www.itunes.com/music.mp3" length="32767"
type="audio/mpeg" />
```

Table 2 illustrates exemplary syndicated notification information.

TABLE 2

Item 1:
Title: State awards new building contract.
Description: The State of Texas has a awarded a new $100 building contract to ABC Construction to build a new bridge over the Red River.
Link: http://www.illinois.state.us.gov/news/2004/build.htm
Item 2:
Title: Governor to host fund raising dinner.
Description: Governor Jones will host a fund raising dinner on Sep. 12, 2004.
Link: http://www.illinois.state.us.gov/news/2004/dinner.htm For example, if RSS is being used, RSS information is placed into a single file on a website on a server 22, 24 in a manner similar to normal web pages. However, the RSS information is coded in the XML computer language for use by an application program 20 (e.g., an RSS aggregator) and not by a user like a normal web page.

Table 3 illustrates exemplary RSS information for Item 1 of Table 2.

TABLE 3

```
<item>
    <title> State awards new building contract.</title>
    <link> http://www.illinois.state.us.gov/news/2004/build.htm</link>
    <description> The State of Texas has a awarded a new $100
building contract to ABC Construction to build a new bridge over the
Red River </description>
</item>
```

A syndicated information aggregator application 20 functions as web browser for syndicated content. Syndicated information aggregators 20 automatically check a series of information feeds for new items on an ongoing basis, making it is possible to keep track of changes to multiple websites without needing to tediously read and re-read each of the websites. They detect the additions and present them in a compact and useful manner. If the title and description of an item are of interest, the link can be used to quickly bring the related web page up for reading.

Figure 2:
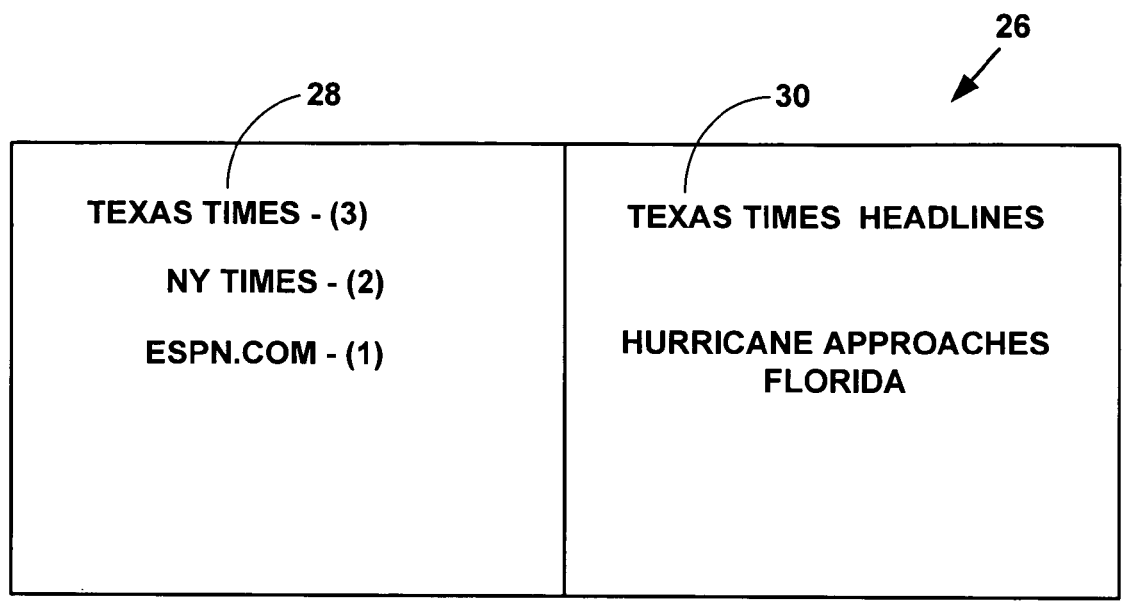
FIG. 2 is a block diagram illustrating a syndicated information aggregator application.

FIG. 2 is a block diagram 26 illustrating a syndicated information aggregator application. On the left 28 is a list of the RSS feeds being monitored, along with an indication of the number of unread items in each feed in parenthesis. On the right 30 are the details of the most recent items in a selected RSS feed (in this case, the Texas Times).

Tracking Syndicated Information

Figure 3:
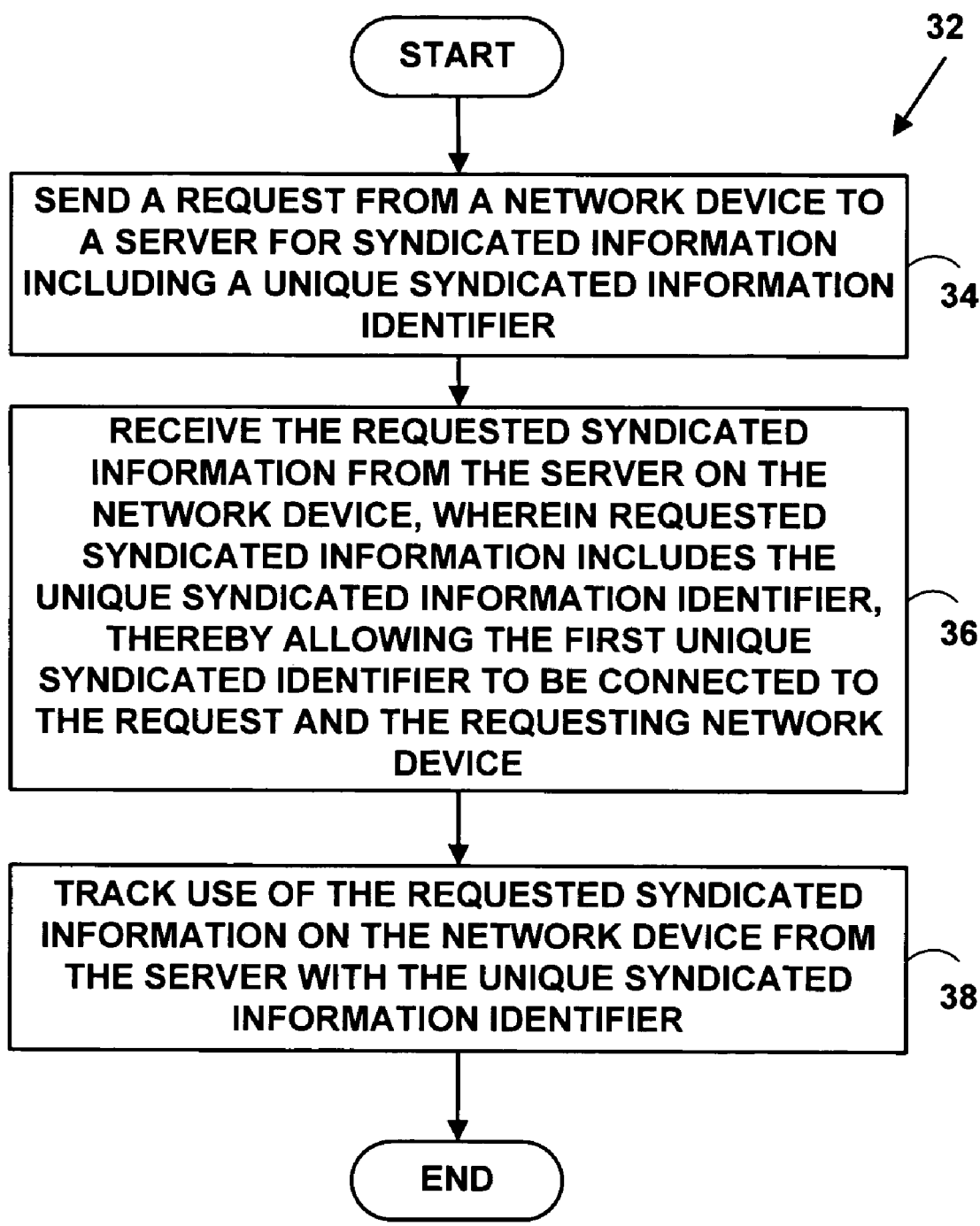
FIG. 3 is a flow diagram illustrating a method for providing syndicated information.

FIG. 3 is a block diagram illustrating a Method 32 for tracking syndicating information. At Step 34, a request is sent from a network device to a server for syndicated information including a unique syndicated information identifier. At Step 36, the requested syndicated information is received from the server on the network device. The requested syndicated information includes the unique syndicated information identifier, thereby allowing the unique syndicated identifier to be connected to the request and the requesting network device. At Step 38, use of the requested syndicated information on the network device is tracked from the server using the unique syndicated information identifier.

In one embodiment, Method 32 further comprises Step 40 as writing information (e.g., a digital cookie) on the requesting network device via the server. In another embodiment, Method 32 further comprises Step 40 as writing information another network device via the server that did make the request for the syndicated information. In another embodiment, Method 32 further comprises Step 40 as writing information on the requesting network device via the server and storing the information on the server.

Method 32 is illustrated with one exemplary embodiment. However, the present invention is not limited to this embodiment and other embodiments can be used to practice the invention.

In such an exemplary embodiment At Step 34, a request is sent from application 20 on a network device 12 to a server 20, 22 for syndicated information including a unique syndicated information identifier. In one embodiment, the request includes an item identifier, a syndicated feed identifier and a universal unique identifier. An exemplary request for syndicated information is illustrated in Table 4 (e.g., <link> . . . </link>). However, the present invention is not limited to this embodiment and more, fewer or other information can be included in the request.

TABLE 4

<item>
<title>
<![CDATA [
Padres do fast fade yet again
]]></title>
<link>http://rss.domain.com/parsers/count_item.php?
item_id=103709&feed_id=606&
UUID=JLMMKEpFDDIDMEHEDFGDEpJKBEDDBKEBFHF</link>
<pubDate>Wed, 14 Sep 2005 21:30:01 +0000</pubDate>
</item>

At Step 36, the requested syndicated information is received from the server 20, 22 on the application 20 on the network device 12. The requested syndicated information includes the unique syndicated information identifier thereby allowing the unique syndicated identifier to be connected to the request and the requesting network device 12.

At Step 38, use of the requested syndicated information on the network device 12 is tracked from the server 20, 22 using the unique syndicated information identifier. The use tracking includes viewing, linking, forwarding, etc. For example, Table 5 illustrates source information for an exemplary syndicated news feed returned when a user of the network device 12 requests the syndicated news item illustrated in Table 4. When a user of the network device 12, selects the link "READ FULL STORY" for this syndicated news item illustrated in Table 5, the unique syndicated information identifier is included so the server 20, 22 can track use of the requested syndicated information.

TABLE 5

<html>
<body>
<P>
Padres do fast fade yet again
<P>
A sloppy pennant race like few others in the history of baseball stayed
true to form last night when the skidding Padres gave more hope to
the banged-up losers that are chasing them.
<P>
href="http://games.espn.go.com/ffl/?
campaign=FFL05&source=
JLMMKEpFDDIDMEHEDFGDEpJKBEDDBKEBFHF
&other_id=PQRABSKTEP">READ FULL STORY</a>
</body>
</html>

Figure 4:
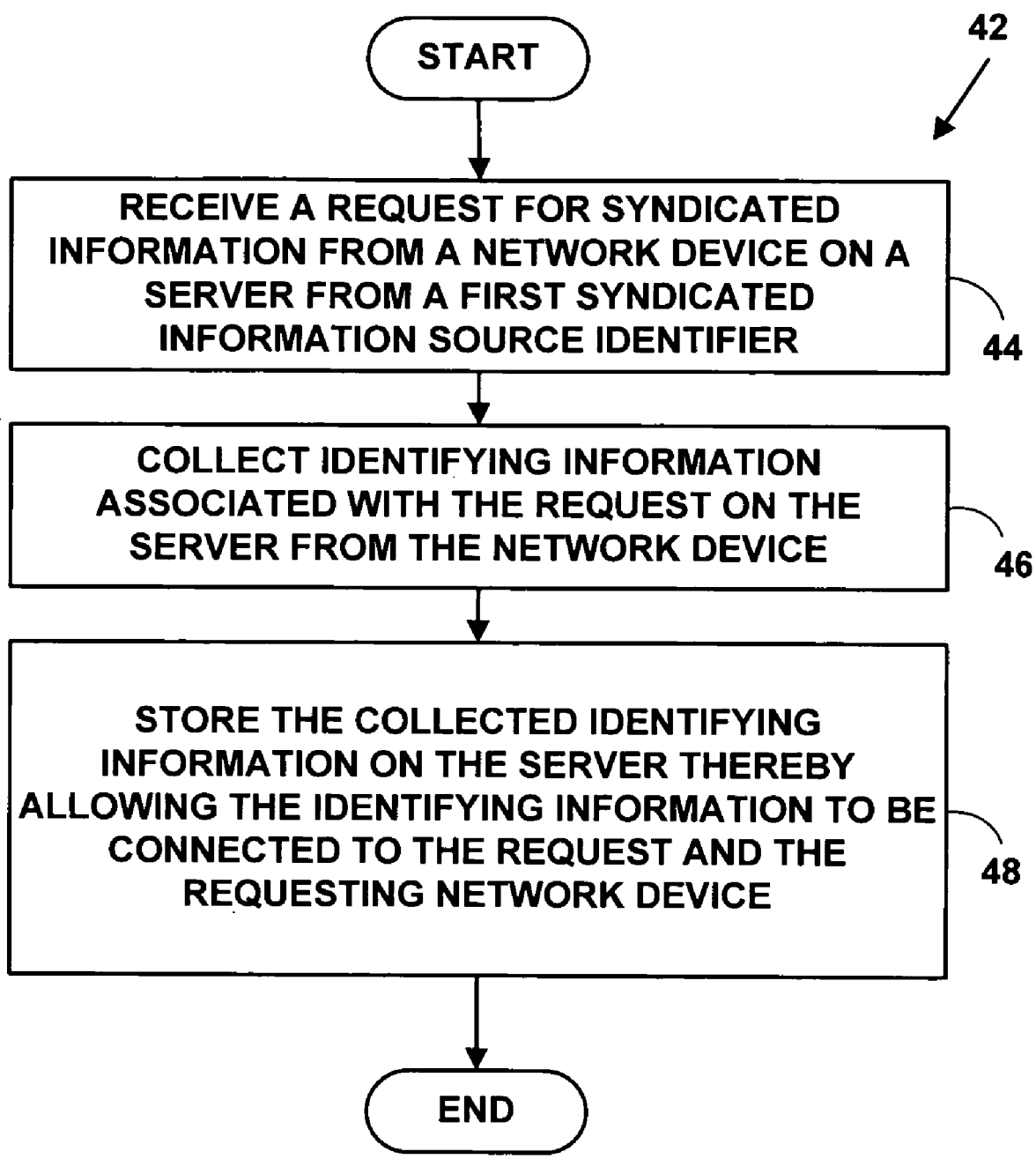
FIG. 4 is a flow diagram illustrating a method for tracking syndicated information.

FIG. 4 is a block diagram illustrating a Method 42 for tracking syndicated information. At Step 44, a request is received on a server from a network device for syndicated information including a unique syndicated information source identifier. At Step 46, identifying information associated with the request is collected from the network device on the server. At Step 48, the collected identifying information is stored on the server, thereby allowing the identifying information to be connected to the request and the requesting network device.

In one embodiment, Method 42 further comprises Step 49 as writing information (e.g., a digital cookie) on the requesting network device via the server. In another embodiment, Method 42 further comprises Step 49 as writing information another network device via the server that did make the request for the syndicated information. In another embodiment, Method 42 further comprises Step 49 as writing information on the requesting network device via the server and storing the information on the server.

Method 42 is illustrated with one exemplary embodiment. However, the present invention is not limited to this embodiment and other embodiments can be used to practice the invention.

In such an exemplary embodiment at Step 44, a request is received on a server 22, 24 from a network device 12 for syndicated information. For example, for the news feed item illustrated in Table 4.

In one embodiment at Step 46, identifying information in the request URL is collected. For example, the item identifier, feed identifier or UUID illustrated in Table 4. In addition, other information is collected about the network device 12 on the server 20, 22 when the HTTP request is processed.

In another embodiment at Step 46, identifying information in the form of a digital cookie is collected on the network device 12 associated with the request on the network device 12 from the server 20, 22. As is known in the art, a "digital cookie" is a block of data that uniquely identifies a client device and includes other relevant information. A digital cookie is typically generated by a server device 22, 24 and is returned to a client device 12 in response to a request for syndicated information from the client device 12.

In one embodiment, the digital cookie, includes, but is not limited to, a syndication identifier (e.g., Syndicate IQ Unique ID), a source identifier (e.g., Source ID) and other identifying information (e.g., IP address, hardware address, device name, etc.). However, the present invention is not limited to this information and more, fewer of other types of information can be used to practice the invention.

Figure 5:
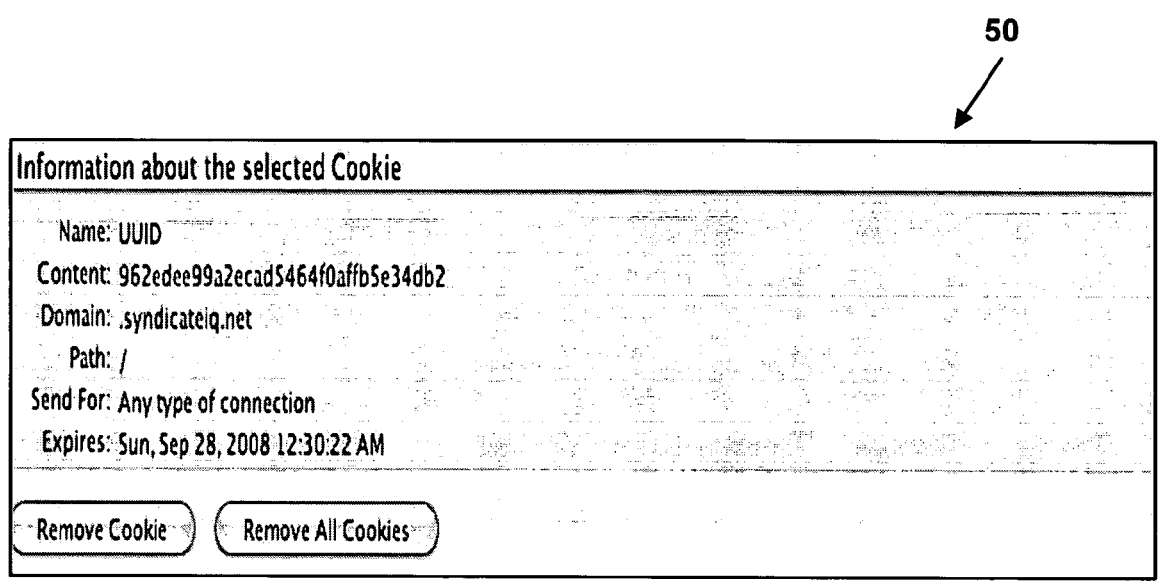
FIG. 5 is a block diagram illustrating and exemplary digital cookie used to track requested syndicated information.

FIG. 5 is a block diagram illustrating and exemplary digital cookie 50.

In another embodiment, a value of the syndication identifier is stored in the digital cookie as well as part of the RSS URL available for an end-user to insert into the aggregator. So an aggregator making a request "behind the scenes" has the syndication identifier as part of making the request so the digital cookie is not needed to identify the user.

In another embodiment, the device 12 (or application 20) storing the digital cookie may or may not be the same device 12 (or application 20) requesting the syndicated information feed.

At Step 48, the collected identifying information is stored on the server 20, 22, thereby allowing the identifying information to be connected to the request and the requesting network device 12.

In one embodiment of "picking up" a syndicated information feed does not always involve an actual aggregator. The syndication identifier is appended to a RSS URL added to an aggregator. The aggregator and a web browser can be one in the same (e.g., Safari and Longhorn/Internet Explorer) or can be different.

In one embodiment, Method 32 further comprises Step 40 as writing information on the requesting network device 12 via the server 22, 24 in the form of a digital cookie stored on the requesting network device 12.

Figure 6:
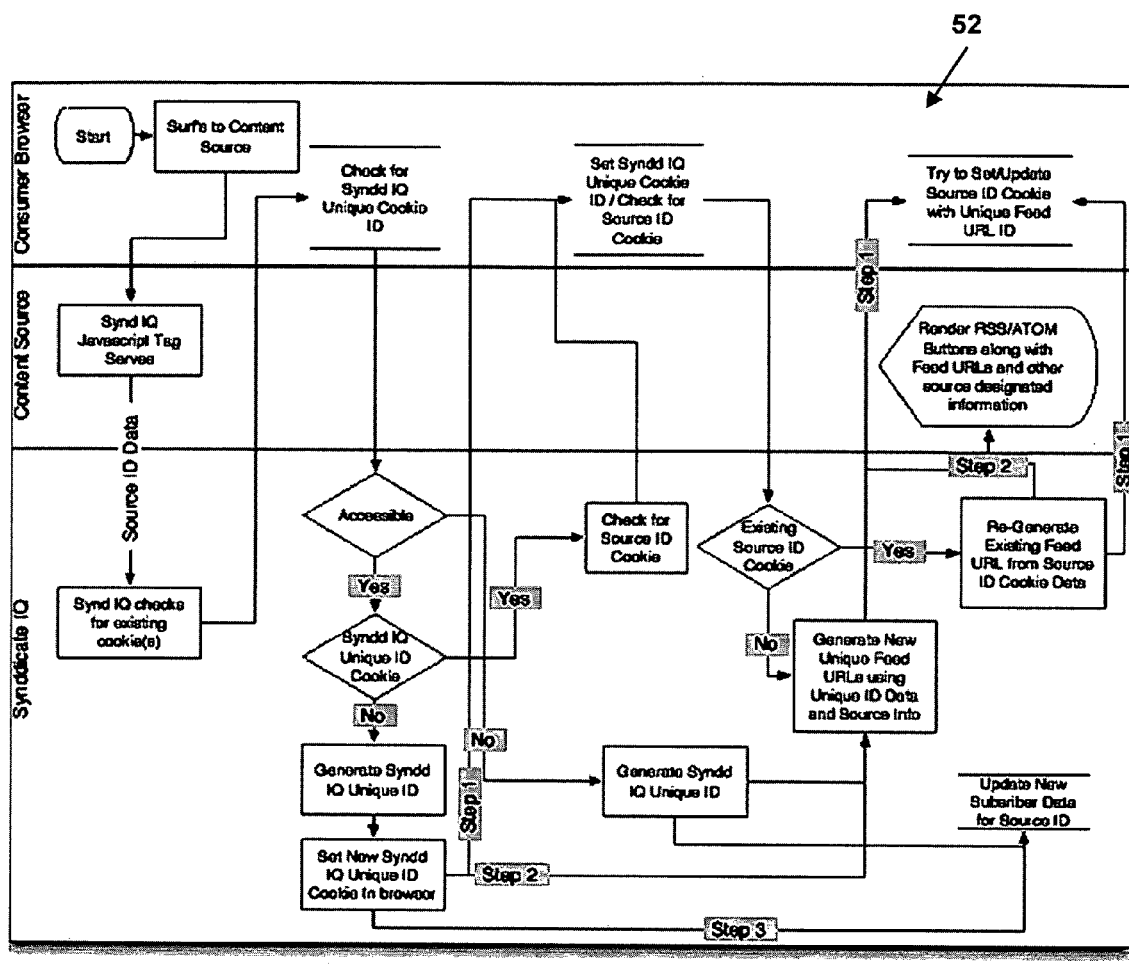
FIG. 6 is a block diagram illustrating a data flow for providing syndicated information.

FIG. 6 is a block diagram illustrating a data flow 52 for providing syndicated information. However, the present invention is not limited to such a data flow and other data flows can also be used to practice the invention.

Figure 7:
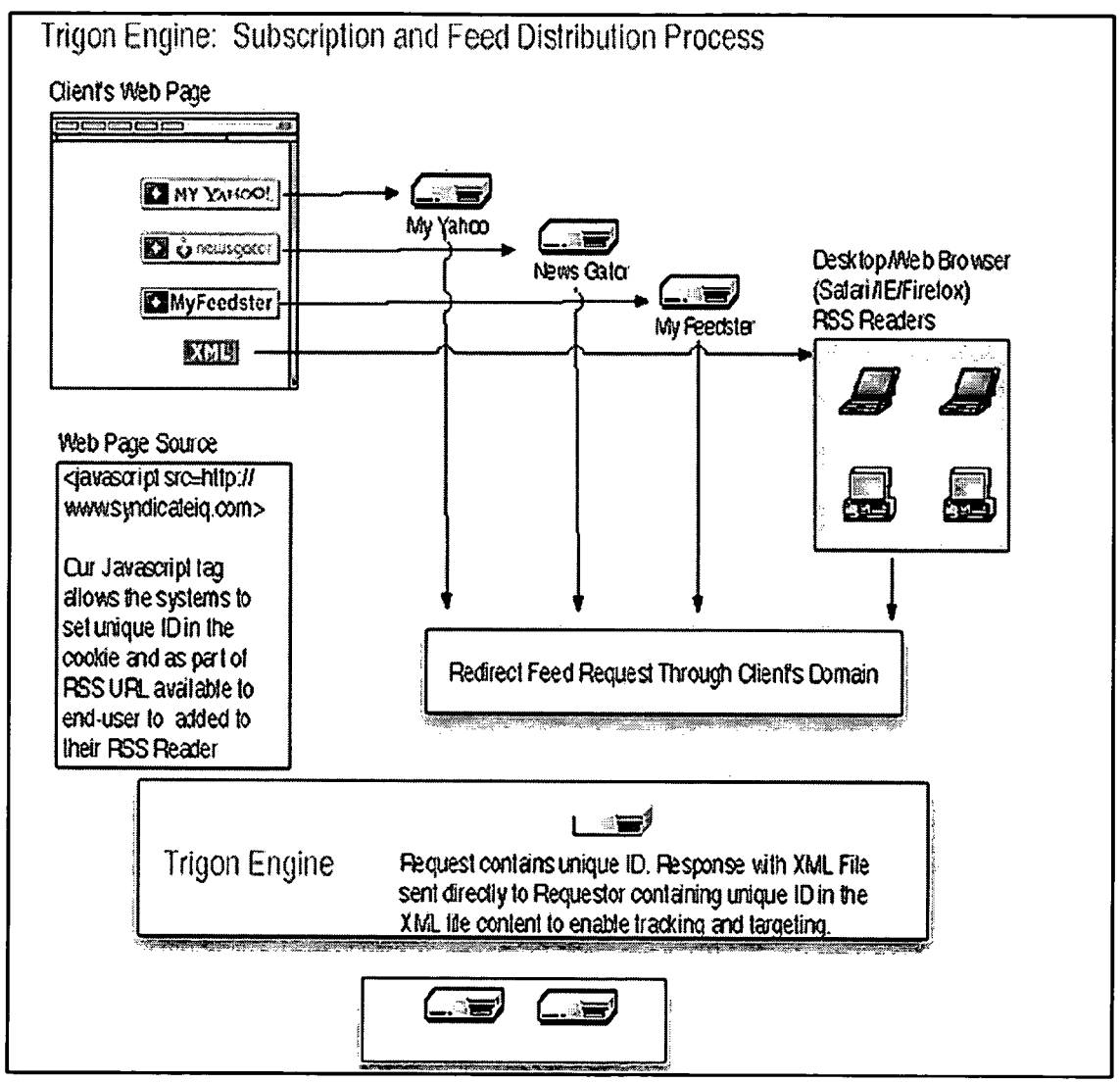
FIG. 7 is a block diagram illustrating another data flow for providing syndicated information.

FIG. 7 is a block diagram illustrating another data flow 54 for providing syndicated information.

FIG. 8 is a flow diagram illustrating a Method 56 for tracking requesters of syndicated information. At Step 58, a syndicated information source identifier is generated on a server 20, 22 including identifying information collected from a network device 12 in response to a request for syndicated information. At Step 60, the generated syndicated information source identifier is used to personalize, customize, or target users of network devices 12 via requests for syndicated information.

FIG. 9 is a flow diagram illustrating a Method 62 for tracking anonymous users of syndicated information. At Step 64, an anonymous syndicated information source identifier is generated on a server 20, 22 for a network device 12 in response to a request for syndicated information. At Step 66, the generated anonymous syndicated information source identifier to track an anonymous user's behavior with respect to requesting and consuming syndicated information.

In one embodiment, Method 62 may further include Step 67, using the generated anonymous syndicated information source identifier to improve distribution of the syndicated information.

In one embodiment, the anonymous syndicated information source identifier includes information that does not allow an anonymous user to be identified but does allow the requested syndicated information to be tracked.

In another embodiment, the anonymous syndicated source identifier includes information that does allow the anonymous user to be identified.

FIG. 10 is a flow diagram illustrating a Method 68 for altering requests for syndicated information. At Step 70, a request is received on a first server 20 from a network device 12 for syndicated information. At Step 72, the request is altered for the syndicated information to include a syndicated information source identifier. At Step 74, the altered request is redirected from the first server 20 to a second server 22 using the syndicated information source identifier in the altered request, thereby allowing the identifying information to be connected to the request and the requesting network device 12.

The methods and system described herein provide the ability to personalize, customize, and target users of network devices via their requests for syndicated information. For example, users could be targeted by advertisers based on their interests and requests of various syndicated information feeds. An anonymous user's behavior with respect to requesting and consuming (i.e., reading, listening, watching, etc.) syndicated information can be recorded and use to improve distribution of the syndicated information. The methods may also be used to provide additional functionality to syndicated information aggregators and readers. For example, by formatting and displaying new and/or previously viewed items. The methods also provide the ability to redirect or otherwise alter requests for syndicated information.

The methods and system are used for tracking multiple information channels, the end-users of those channels, and the distribution partners utilizing those channels to re-syndicate the information on a communications network It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect.

In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for tracking syndicated information, comprising:

sending a request from a network device with one or more processors to a server device with one or more processors for syndicated information including a unique syndicated information identifier, wherein the request includes a request for the network device to receive and consume the syndicated information in an anonymous manner without revealing identifying information for the network device to other network devices requesting the syndicate information;

receiving the requested syndicated information from the server on the network device, wherein the requested syndicated information includes a unique anonymous syndicated information source identifier, thereby allowing the unique anonymous syndicated identifier to connected the request and the network device in an anonymous manner;

tracking use of the requested syndicated information on the network device from the server using the unique anonymous syndicated information source identifier in an anonymous manner without revealing identifying information for the network device to other network devices requesting the syndicate information.

2. The method of claim 1 further comprising a computer readable medium having stored therein instructions for causing one or more processors to execute the steps of the method.

3. The method of claim 1 wherein the step of sending a request includes sending a syndicated news item request.

4. The method of claim 1 wherein the request includes a Really Simple Syndication, Really Simple Syndication, ATOM, or extensible markup language (XML) request for syndicated information.

5. The method of claim 1 wherein the server includes Really Simple Syndication, Rich Site Summary, ATOM, or extensible markup language (XML) server.

6. A method for tracking syndicated information, comprising:
- receiving a request on a server with one or more processors from a network device with one or more processors for syndicated information including a unique syndicated information source identifier, wherein the unique syndicated information identifier includes a request for the network device to receive and consume the syndicated information in an anonymous manner;
- collecting identifying information associated with the request from the network device on the server;
- storing the collected identifying information on the server, thereby allowing the identifying information to be connected to the request and the requesting network device in an anonymous manner without revealing identifying information for the network device to other network devices requesting the syndicate information;
- generating a unique anonymous syndicated information source identifier on the server for the network device in response to the request for syndicated information; and
- using the generated anonymous syndicated information source identifier on the server to deliver the requested syndicated information and to track behavior of the network device with respect to requesting and consuming requested syndicated information without revealing identifying information for the network device to other network devices requesting the syndicate information.

7. The method of claim 6 further comprising a computer readable medium having stored therein instructions for causing one or more processors to execute the steps of the method.

8. The method of claim 6 wherein the step of receiving a request includes receiving a syndicated news item request.

9. The method of claim 6 wherein the request includes a Really Simple Syndication, Really Simple Syndication, ATOM, or extensible markup language (XML) request for syndicated information.

10. The method of claim 6 wherein the unique syndicated information source identifier includes a uniform resource locator (URL) from the network device.

11. The method of claim 6 wherein the server includes Really Simple Syndication, Rich Site Summary, ATOM, or extensible markup language (XML) server.

12. The method of claim 6 wherein the step of collecting identifying information includes collecting a digital cookie from the network device.

13. The method of claim 12 wherein the step of collecting identifying information includes collecting a unique syndication identifier, a source identifier and other identifying information including an Internet Protocol (IP) address for the network device, hardware address for the network device, or a device name for the network device.

14. The method of claim 6 further comprising:
- writing information on the network device via the server in the form of a digital cookie; and
- storing the digital cookie on the network device.

15. The method of claim 6 further comprising:
- writing information on a first network device making the request via the server in the form of a digital cookie; and
- storing the digital cookie on a second network device.

16. The method of claim 6 further comprising:
- writing information on the network device via the server in the form of a digital cookie on the network device; and
- storing the digital cookie on the server.

17. The method of claim 6 further, comprising:
- generating a non-anonymous syndicated information source identifier on a server including identifying information collected from a network device in response to a request for syndicated information; and
- using the generated non-anonymous syndicated information source identifier to personalize, customize, or target users of other network devices via requests for syndicated information.

18. The method of claim 17 further comprising a computer readable medium having stored therein instructions for causing one or more processors to execute the steps of the method.

19. The method of claim 17 wherein the request for syndicated information includes a Really Simple Syndication, Rich Site Summary, ATOM, or extensible markup language (XML) request for syndicated information.

20. The method of claim 6 further comprising:
- improving distribution of the syndicated information by allowing anonymous use of the syndicated information, wherein the anonymous use of the syndicated information does not allow an anonymous user to be identified but does allow use of the requested syndicated information by the network device to be tracked on the server.

21. The method of claim 20 further comprising a computer readable medium having stored therein instructions for causing one or more processors to execute the steps of the method.

22. The method of claim 20 wherein the request for syndicated information includes a Really Simple Syndication, Rich Site Summary, ATOM, or extensible markup language (XML) request for syndicated information.

23. The method of claim 6 further comprising:
- receiving a request on a first server from a requesting network device for syndicated information; and
- altering the request for the syndicated information to include a syndicated information source identifier; and
- redirecting the request from the first server to a second server using the syndicated information source identifier in the altered request, thereby allowing the identifying information to be connected to the request and the requesting network device.

24. The method of claim 23 further comprising a computer readable medium having stored therein instructions for causing one or more processors to execute the steps of the method.

25. The method of claim 23 wherein the request for syndicated information includes a Really Simple Syndication, Rich Site Summary, ATOM, or extensible markup language (XML) request for syndicated information.

26. A syndicated information tracking system, comprising in combination:
- means for sending a request from a network device to a server for syndicated information including a unique syndicated information identifier, wherein the unique syndicated information identifier includes a unique syndication identifier, a source identifier and other identifying information including an Internet Protocol (IP) address, a hardware address for the network, or a device name for the network device and wherein the request includes a request for the network device to receive and consume the syndicated information in an anonymous manner without revealing identifying information for the network device to other network devices requesting the syndicate information;
- means for receiving the requested syndicated information from the server on the network device, wherein the requested syndicated information includes the unique syndicated information identifier, thereby allowing the unique syndicated identifier to be connected to the request and the requesting network device;

means for tracking use of the requested syndicated information on the network device from the server using the unique syndicated information identifier.

27. The system of claim 26 further comprising:

means for receiving a request on a server from a network device for syndicated information including a first unique syndicated information source identifier, for collecting a digital cookie from the network device, for generating an anonymous syndicated information source identifier on the server for the network device in response to the request for syndicated information; and for using the generated anonymous syndicated information source identifier to track the network device's behavior with respect to requesting and consuming requested syndicated information in an anonymous manner without revealing identifying information for the network device to other network devices requesting the syndicate information;

means for collecting identifying information associated with the request from the network device on the server; and means for storing the collected identifying information on the server, thereby allowing the identifying information to be connected to the request and the requesting network device.

28. The syndicated information system of claim 27 further comprising:

means for using the generated syndicated information source identifier to personalize, customize, or target users of network devices via requests for syndicated information.

29. The syndicated information system of claim 27 further comprising:

means for redirecting the request from the server to a second server using the syndicated information source identifier.

* * * * *